(12) United States Patent
Jansson

(10) Patent No.: US 9,233,426 B2
(45) Date of Patent: Jan. 12, 2016

(54) OCTAGONAL CUTTING INSERT HAVING EDGE PORTION WITH VARIABLE WEDGE ANGLE, AND CUTTING TOOL

(75) Inventor: Mikael Jansson, Avesta (SE)

(73) Assignee: SECO TOOLS AB, Fagersta (SE)

( * ) Notice: Subject to any disclaimer, the term of this patent is extended or adjusted under 35 U.S.C. 154(b) by 372 days.

(21) Appl. No.: 14/000,495

(22) PCT Filed: Feb. 15, 2012

(86) PCT No.: PCT/EP2012/052538
§ 371 (c)(1),
(2), (4) Date: Sep. 5, 2013

(87) PCT Pub. No.: WO2012/113682
PCT Pub. Date: Aug. 30, 2012

(65) Prior Publication Data
US 2013/0336732 A1 Dec. 19, 2013

(30) Foreign Application Priority Data

Feb. 24, 2011 (EP) .................................. 11155730

(51) Int. Cl.
*B23C 5/20* (2006.01)
*B23C 5/06* (2006.01)
*B23C 5/00* (2006.01)

(52) U.S. Cl.
CPC . *B23C 5/207* (2013.01); *B23C 5/06* (2013.01); *B23C 2200/0422* (2013.01); *B23C 2200/128* (2013.01); *B23C 2200/286* (2013.01); *B23C 2210/045* (2013.01); *B23C 2210/0407* (2013.01); *B23C 2210/0457* (2013.01); *B23C 2210/66* (2013.01); *Y10T 407/1934* (2015.01); *Y10T 407/23* (2015.01)

(58) Field of Classification Search
CPC .......... B23C 5/06; B23C 5/202; B23C 5/207; B23C 2200/0422; B23C 2200/283; B23C 2200/286
USPC .................................................. 407/113, 114
See application file for complete search history.

(56) References Cited

U.S. PATENT DOCUMENTS

| | | | | |
|---|---|---|---|---|
| 5,807,031 A * | 9/1998 | Arai | ........................ | B23C 5/202 407/113 |
| 6,935,815 B2 * | 8/2005 | Schwaner | ............... | B23C 5/205 407/114 |
| 7,604,441 B2 * | 10/2009 | Bhagath | .................... | B23C 5/06 407/113 |
| 8,231,311 B2 * | 7/2012 | Ballas | .................... | B23C 5/2213 407/113 |
| 8,777,524 B2 * | 7/2014 | Choi | ........................ | B23C 5/109 407/113 |
| 8,961,076 B2 * | 2/2015 | Ishi | .......................... | B23C 5/06 407/113 |

FOREIGN PATENT DOCUMENTS

WO       2007075140 A1     7/2007

* cited by examiner

*Primary Examiner* — Will Fridie, Jr.
(74) *Attorney, Agent, or Firm* — Corinne R. Gorski

(57) ABSTRACT

A cutting insert includes a top surface, a bottom surface, and a side surface extending between the top and bottom surfaces. The top surface is generally octagonal in shape and the side surface includes eight sides and eight corners. Four edge portions are formed at an intersection of the top and side surface. A first end of each edge portion begins along one of the eight sides at a non-zero distance from any of the eight corners and a second end of the edge portion ends along another one of the eight sides that is non-consecutive to the one of the sides. Each edge portion has a wedge angle that changes from a first angle at the first end of the edge portion to a different angle at the second end of the edge portion. A cutting tool using such an insert is also disclosed.

18 Claims, 5 Drawing Sheets

OCTAGONAL CUTTING INSERT HAVING EDGE PORTION WITH VARIABLE WEDGE ANGLE, AND CUTTING TOOL

RELATED APPLICATION DATA

This application is a §371 National Stage Application of PCT International Application No. PCT/EP2012/052538 filed on Feb. 15, 2012 claiming priority of European Application No. 11155730.2, filed Feb. 24, 2011.

BACKGROUND AND SUMMARY

The present invention relates to octagonal cutting inserts and, more particularly, to such cutting inserts with variable wedge angles along cutting edges of the cutting inserts.

In machining operations involving rotating tools provided with typical octagonal cutting inserts, each corner of the cutting insert functions as a cutting edge. To avoid excessive cutting forces, the insert is typically oriented relative to the workpiece so that only a portion of the edge at a deepest part of the cut performs a cutting operation, i.e., the bottom side of the octagon forms a non-zero angle with a plane perpendicular to an axis of rotation of the cutting tool. Consequently, it is difficult to form a flat surface on the workpiece. U.S. Pat. No. 5,807,031 discloses an insert providing sixteen corners, and providing an edge portion starting exactly at one of the corners. WO2007/075140 discloses double-sided inserts.

At different parts of the working portion of a cutting edge, it will often be desirable to have different characteristics. For example, at a deepest part of a cut, it may be desirable to have a sharper edge (smaller wedge angle) than at a portion of the cut in the feed direction, where edge strength may be more important and a larger wedge angle can be used. Because the end of one working portion of a cutting edge is generally immediately succeeded by the beginning of the next edge, it can be difficult to provide appropriate wedge angles at different parts of a cutting edge.

Additionally, because approximately half of each of the eight edges of the octagon is intended to perform a cutting operation at a deepest part of the cut, and approximately half of each of the eight edges is intended to perform a cutting operation in the feed direction, it is difficult to optimize the rake angles for each function. For example, it might be desirable to provide a positive rake angle at a deepest part of the cut, while it might be desirable to provide a different, possibly larger or smaller rake angle, possibly a negative rake angle, at a portion of the cutting edge that is oriented in the feed direction. Where the beginning of one cutting edge follows immediately upon the end of another, this optimization may be difficult.

It is desirable to provide an octagonal cutting insert that can facilitate forming flat surfaces on a workpiece. It is also desirable to provide an octagonal cutting insert in which cutting edge wedge angles can be optimized at different points along the length of the cutting edge. It is also desirable to provide a cutting insert in which rake angles of the cutting edge can be optimized at different points along the length of the cutting edge.

According to an aspect of the present invention, a cutting insert includes a top surface, a bottom surface, and a side surface extending between the top surface and the bottom surface. The top surface is generally octagonal in shape and the side surface includes eight sides and eight corners, each side being defined by two corners at opposite ends of the side. Four edge portions are formed at an intersection of the top surface and the side surface, a first end of each edge portion beginning along one of the eight sides at a non-zero distance from any of the eight corners and a second end of the edge portion ending along another one of the eight sides that is non-consecutive to the one of the sides at the non-zero distance from any of the eight corners, each edge portion having a wedge angle that changes from a first angle at the first end of the edge portion to a different angle at the second end of the edge portion.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1B:
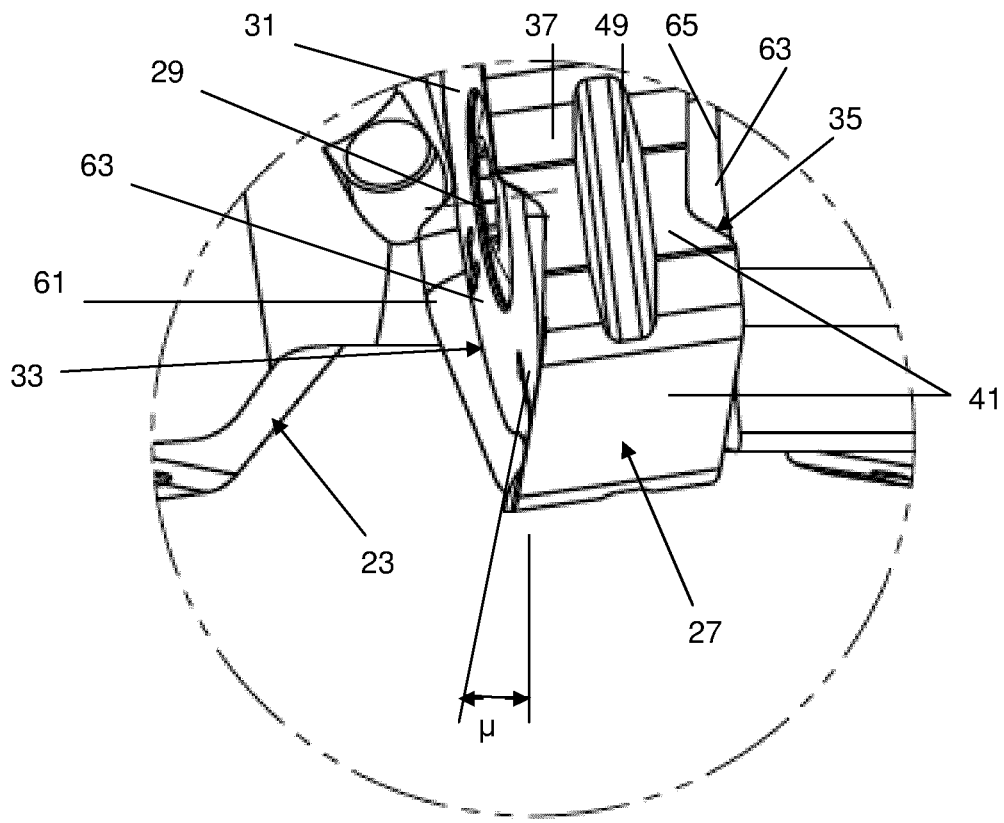
FIG. 1B is an enlarged view of a portion of the cutting tool of FIG. 1A.
Figure 1A:
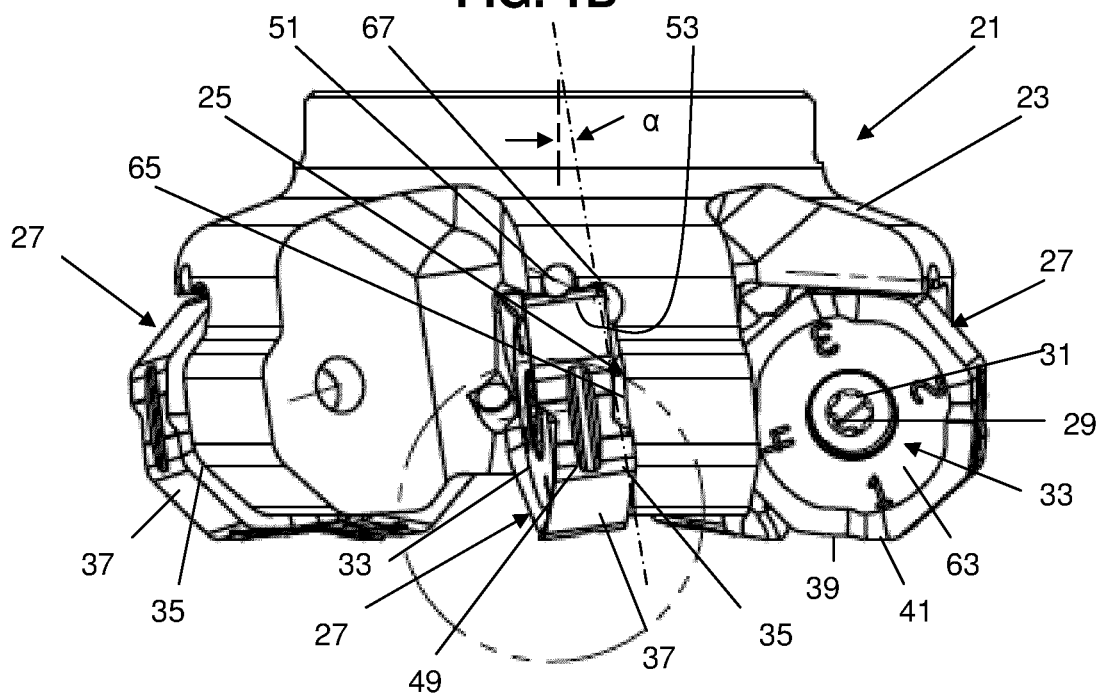
FIG. 1A is a side view of a cutting tool according to an aspect of the present invention.
Figure 1C:
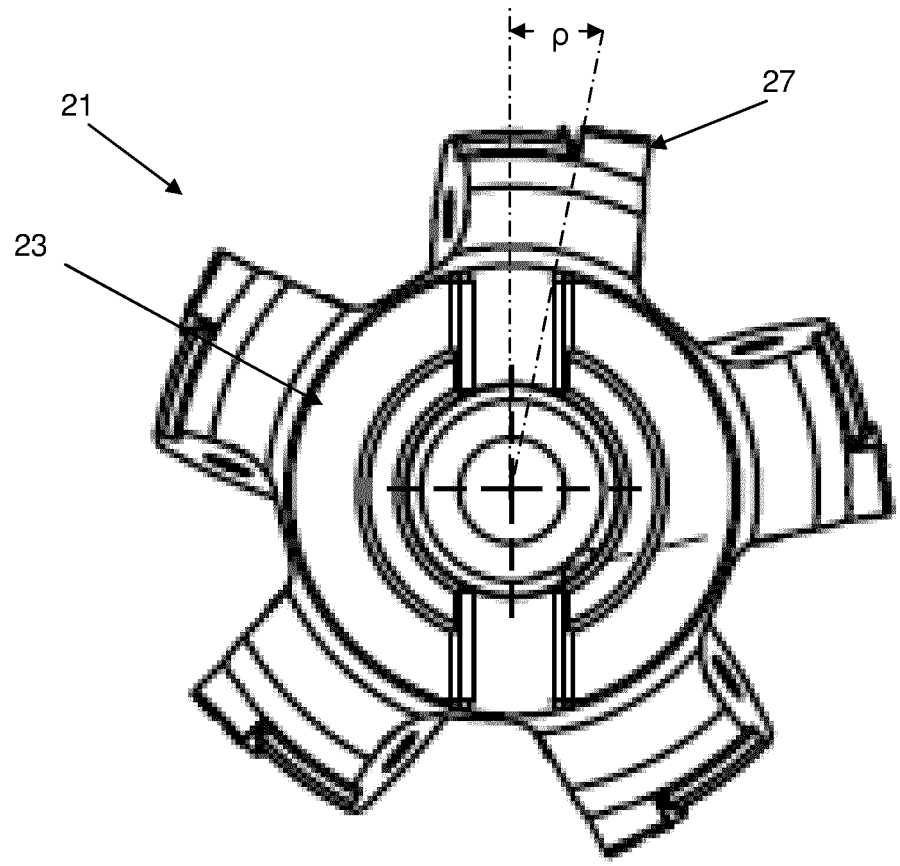
FIG. 1C is a top view of the cutting tool of FIG. 1A.

A rotating tool 21 comprising a toolholder 23 having at least one insert receiving recess 25 for receiving a cutting insert 27, and a clamp 29 for clamping the cutting insert in the recess, is shown in FIGS. 1A-1C. The rotating tool 21 can be any one of a variety of rotating tools, such as a milling tool, a boring tool, or the like. A milling tool is shown in FIGS. 1A-1C. The clamp 29 in the tool 21 can be a screw that extends through a central hole 31 in the cutting insert 27 and that has threads (not shown) that mate with internal threads in holes in the toolholder 23, however, other suitable types of clamps, such as cantilever and other types of arrangements, are known.

Figure 2A:
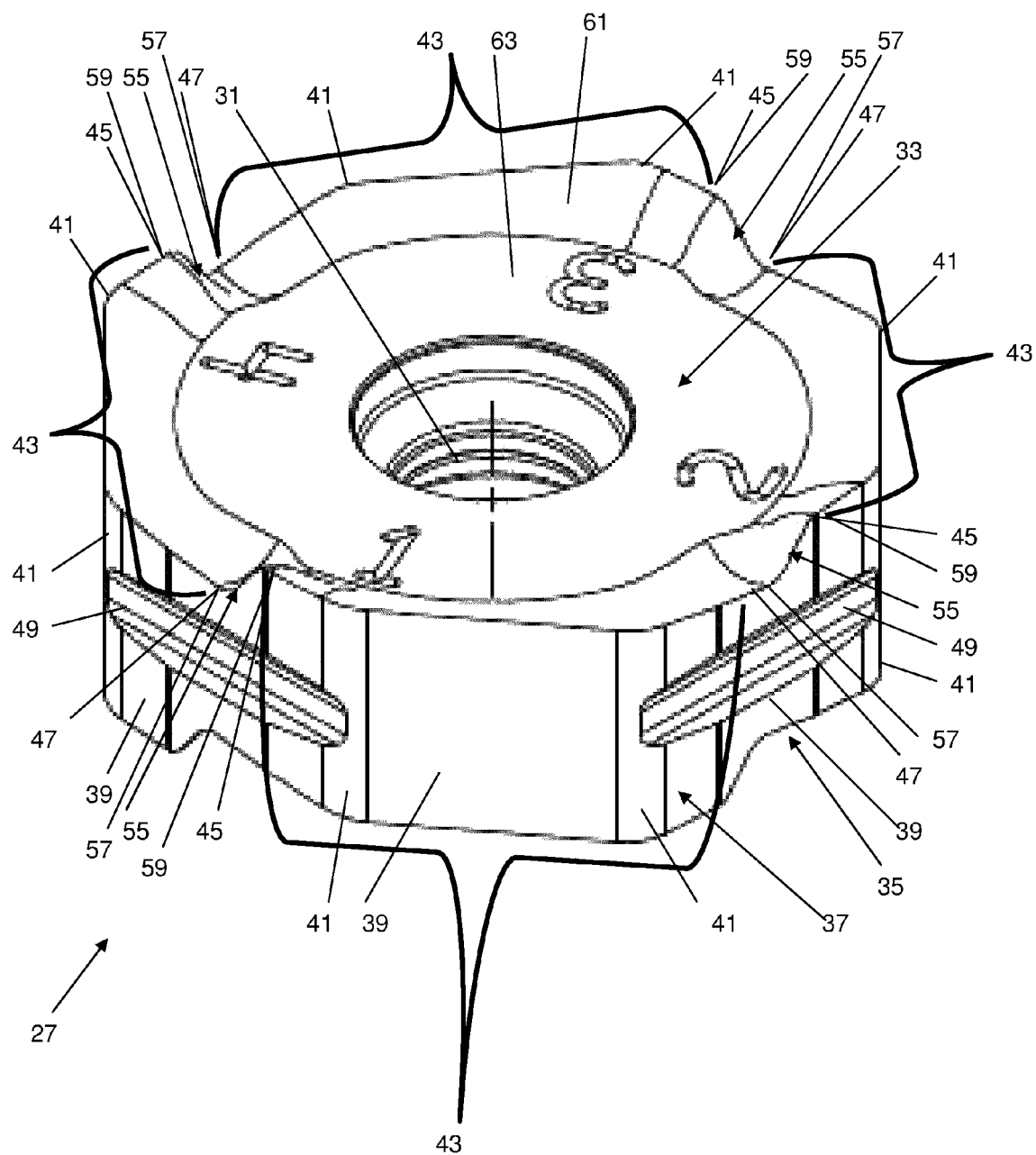
FIG. 2A is a perspective view of a cutting insert according to an aspect of the present invention.
Figure 2B:
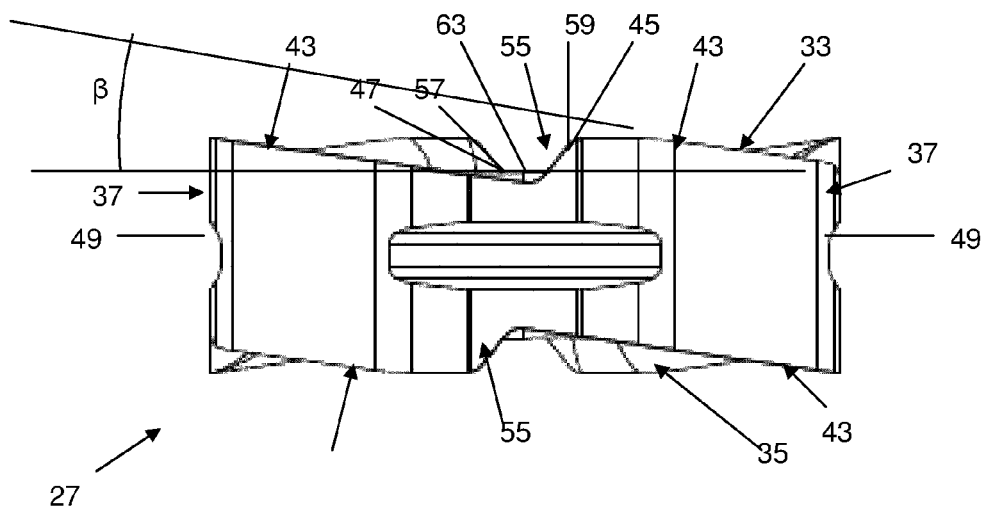
FIG. 2B is a side of the cutting insert of FIG. 2A.
Figure 2C:
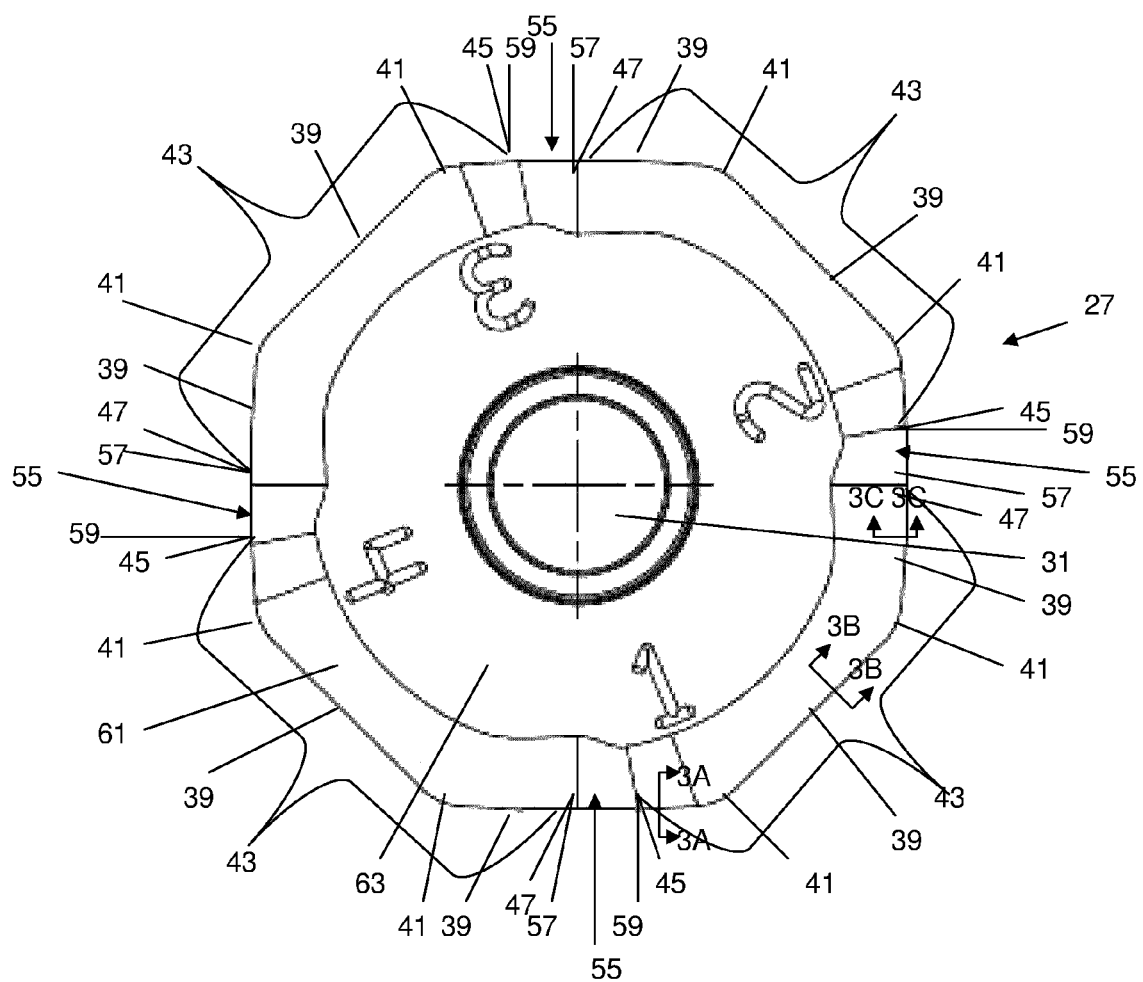
FIG. 2C is a top view of the cutting insert of FIG. 2A.

As seen in FIGS. 2A-2C, the cutting insert 27 comprises a top surface 33, a bottom surface 35, and a side surface 37 extending between the top surface and the bottom surface. The top surface 33 is generally octagonal in shape and the side surface 37 includes eight sides 39 and eight corners 41 each side being defined by two corners at opposite ends of the side. The corners 41 are typically curved segments and the sides 39 are typically substantially straight, planar segments and separated by curved segments, although the corner might instead be in the form of relatively sharp angles, and the sides might be curved.

Only four edge portions 43 are formed at an intersection of the top surface 33 and the side surface 37. A first end 45 of each edge portion 43 ordinarily begins along one of the eight sides 39 at a non-zero distance from any of the eight corners 41 and a second end 47 of the edge portion ends along another one of the eight sides that is non-consecutive to the one of the sides at the non-zero distance from any of the eight corners where the first end 45 begins. In other words, each edge portion 43 extends along at least parts of three sides 39. As seen in FIG. 2B, the part of the edge portion 43 starting at the first end 45 of each edge portion and ending at the adjacent corner 41 may be parallel with an insert supporting surface 63 so that the radial angle at which the insert 27 is held in the toolholder 23 will be the same as the radial rake angle ρ, while the remaining part of the cutting edge portion 43 can form an acute axial angle β (FIG. 2B) with the insert supporting surface 63 and can thus be disposed at a different axial rake angle μ (FIG. 1B) than the axial angle α (FIG. 1A) at which the insert is mounted in the toolholder. By appropriate selection of the angle that the portions of the edge portion 43 form with the insert supporting surface 63, and the axial α and radial angles ρ at which the insert is mounted relative to the toolholder 23, desired radial rake angles and axial rake angles μ (FIG. 1B) can be obtained when the cutting insert is mounted in a rotatable toolholder. The axial rake angle and radial rake angle can, in addition, be varied by, for example, providing a curve to the edge portion 43. The illustrated arrangement can facilitate forming a smooth surface on a workpiece perpendicular to an axis of rotation of the cutting tool 21 because a relatively long cutting edge portion, i.e., the portion from the first end 45 of the edge portion to a corner 41, can be oriented substantially perpendicular to the axis of rotation. At the same time, the portion of the adjacent (preceding) edge portion 43 from the second end 47 to the adjacent corner 41 can be configured so that that portion of the cutting insert 27 is spaced from the workpiece. When an edge portion 43 is indexed to an active position, i.e., it is in what shall be referred to here as an "active" edge portion, that edge portion will ordinarily have an "active" portion, i.e., the portion that is intended to perform a cutting operation—the cutting edge—that extends from the first end 45, around an adjacent corner 41, and partially along an adjacent side 39, and an "inactive" portion, i.e., the rest of the edge portion up to the second end 47.

Figure 3A:
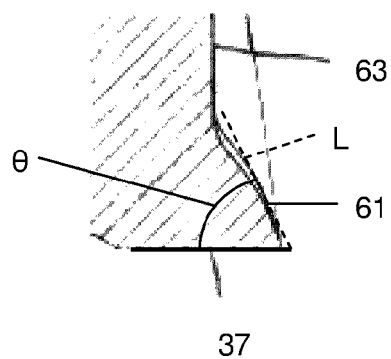
FIG. 3A is a cross-sectional view taken at Section 3A-3A of FIG. 2C.
Figure 3B:
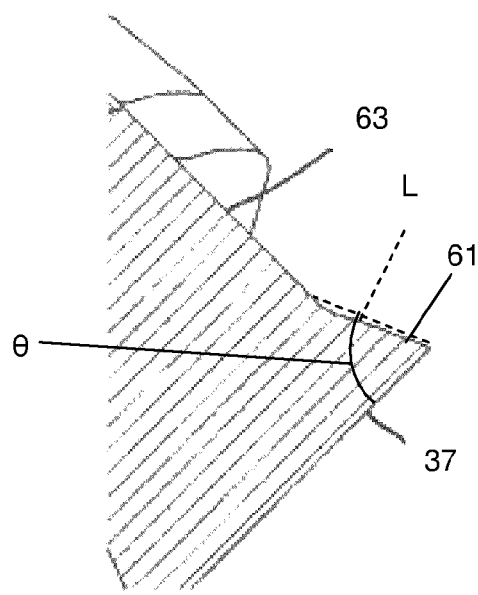
FIG. 3B is a cross-sectional view taken at Section 3B-3B of FIG. 2C.
Figure 3C:
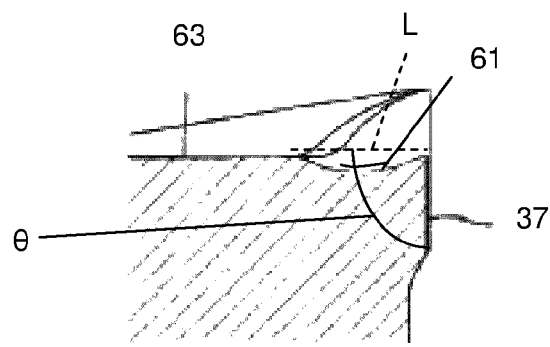
FIG. 3C is a cross-sectional view taken at Section 3C-3C of FIG. 2C.

Ordinarily, the active portion of the edge portion 43 extending from the first end 45 of the edge portion to a point somewhere along an adjacent, succeeding side functions as the cutting edge of the insert. Each edge portion 43 has a wedge angle θ (seen in the sections of the insert shown in FIGS. 3A-3C) which is the angle between the side surface 37 and a straight line L (shown in phantom) between the cutting edge and a point where the rake surface 61 meets the insert supporting surface 63) that, in the illustrated embodiment, changes from an acute angle (FIG. 3A) at the first end 45 of the edge portion to a different, typically smaller wedge angle, which may be an obtuse angle, at the second end 47 of the edge portion (FIG. 3C). The cutting insert 27 is ordinarily clamped in the recess 25 in the toolholder 23 so that the active portion of the edge portion 43 forms a positive radial rake angle ρ (FIG. 1C) from the first end 45 of the edge portion 43 to the adjacent corner 41, and a positive axial rake angle μ (FIG. 1B) is formed by at least the rest of the active portion of the edge portion that functions as a cutting edge, i.e., the portion of the edge portion along the side 39 that functions as a cutting edge and that extends from the corner closest to the first end of the edge portion toward the second end 47 of the edge portion. The entire remaining portion of the active edge portion 43, i.e., the portion from the corner 41 closest to the first end 45 to the second end 47 can have the same axial rake angle μ, although, as shown in FIG. 1B, the inactive portion along the side by the second end 47 may have a different axial rake angle than the portion along the preceding side. Where, as shown in FIGS. 3A-3C, the wedge angle θ can vary from the first end 45 of the edge portion (FIG. 3A) to the end of the active portion of the edge portion (usually at a point near the cross-section taken at FIG. 3B), and still further to the second end 47 (FIG. 3C) of the edge portion, a sharper edge can be provided at a deepest part of the cut into the workpiece, and a stronger edge can be provided at portions of the edge portion in a feed direction of the rotating tool 21.

The side surface 37 may at least partially define a curved portion such as a surface of a cylinder, which will be understood to include cylinders with one or more recesses comprising insert supporting surfaces 49 therein. The recesses 49 in the side surface 37 receive insert abutment protrusions 51 (FIG. 1A) that extend from walls 53 (FIG. 1A) of the recesses 25 in the toolholder 23. International Application PCT/SE2010/050226, filed Feb. 26, 2010, which is incorporated by reference, discloses the use of recesses and protrusions for positioning cutting inserts relative to toolholders. Unlike in the octagonal insert in International Application PCT/SE2010/050226, which is indexable to eight different positions per side, the insert 27 according to an aspect of the present invention is indexable to four different positions per side and, therefore, the recess with insert supporting surfaces 49 need not extend continuously around the circumference of the insert.

The cutting insert 27 may be double-sided, and the bottom surface 35 may be identical to the top surface 33. Providing the side surface 37 in the form of a cylinder facilitates providing a double-sided insert, but is not necessary to the provision of a double sided insert. For example, the side surface may be concave. While it will be appreciated that the insert may be double sided and, thus, have eight edge portions, with four on each side, for purposes of discussion, the insert 27 will be described with reference to the four edge portions on one of the possible two sides, except where otherwise indicated.

Ordinarily, the first end 45 of each of the four edge portions 43 begins on a same one of the sides as the second end 47 of another one of the four edge portions. A transition portion 55 between the first end 45 of each edge portion 43 and a second end 47 of an adjacent (preceding) one of the four edge portions 43 is ordinarily provided. As seen in FIG. 2C, a first end 57 of the transition portion 55 is ordinarily adjacent the second end 47 of an edge portion 43 and is ordinarily disposed substantially at or near a midpoint of a side 39. A second end 59 of the transition portion 55 is ordinarily adjacent the first end 45 of the edge portion 43 and is ordinarily disposed substantially midway between the midpoint of the side 39 and a corner 41 at an end of the side. A wedge angle of the transition portion 55 ordinarily changes from being, e.g., obtuse where the transition portion is closest to the second end 47 of the edge portion 43 to, e.g., acute where the transition portion is closes to the first end 45 of the edge portion. The cutting insert 27 shown in FIGS. 1A-2C has edge portions 43 and transition portions 55 that extend in a counterclockwise direction around the cutting insert from the first end 45 to the second end 47 of the edge portion and from the first end 57 to the second end 59 of the transition portion, however, it will be appreciated that the edge portions and transition portions can extend in a clockwise direction from their first ends to the second ends.

The transition portion 55 ordinarily extends along about one quarter of the length of a side 39, and the edge portion 43 extends along about one quarter of the side from the first end 45 of the edge portion to a corner 41, and along about one half of the side from a corner to the second end 47 of the edge portion. Ordinarily, each edge portion 43 extends, beginning at the first end 45 of the edge portion, over part of a first side 39 of the eight sides, over all of a second side 39 adjacent to, i.e., succeeding, the first side, and, ending at the second end 47 of the edge portion, over part of a third side 39 adjacent to, i.e., succeeding, the second side. Ordinarily, the wedge angle θ of the edge portion 43 along the first side 39 is an acute angle as shown in FIG. 3A, and the wedge angle of the edge portion along the third side 39 is an obtuse angle as shown in FIG. 3C. The wedge angle θ of the edge portion 43 along at least part of the second side 39 closest to the first side can be an acute angle as shown in FIG. 3B, and the wedge angle of the edge portion along another part of the second side closest to the third side can be an obtuse angle as shown in phantom in FIG. 3B.

Inward of the edge portions 43 and transition portions 55, the top surface 33 of cutting insert 27 ordinarily includes rake surfaces 61 that, with the side surfaces 37, define the wedge angle θ. Inward of the edge portions 43 and the rake surfaces 61, the cutting insert 27 typically includes an insert supporting surface 63. The insert supporting surface 63 will ordinarily abut an abutment surface 65 (FIG. 1B) in the recess 25 in the toolholder 23 that does not also contact the rake surfaces 61 The insert supporting surface 63 and the abutment surface 65 can be flat or any other desired shape, such as provided with corresponding grooves and recesses to facilitate proper positioning and prevention of movement of the cutting insert 27 relative to the recess 25. The rake surfaces 61 will ordinarily define a non-zero angle with a plane of the top surface 33 that is perpendicular to an axis of the insert extending through a center of the cutting insert, which may extend through the central hole 31 (if provided). A groove 67 (FIG. 1A) may be provided between walls 53 of the recess and the bottom abutment surface 65 in which rake surfaces 61 and edge portions 43 of the cutting insert can be received. Indicia (e.g., numerals 1, 2, 3, and 4) can be arranged on the top surface 33 (and on the bottom surface) to facilitate determining how and when to index the cutting insert 27.

In the embodiment of the cutting tool 21 shown in FIGS. 1A-1C, supporting surfaces 49 and 63 of the cutting insert 27 abut abutment surfaces 51 and 65 of the recess 25 when the cutting insert is clamped in the recess by the clamp 29 so that the cutting insert is mounted at least at one of, ordinarily both of, an axially negative angle α (FIG. 1A) and a radially negative angle ρ (FIG. 1C) relative to the toolholder. In the tool 21 shown in FIGS. 1A-1C, the insert 23 is held, and the edge portions 43 extend at appropriate angles, so that the portion of the active edge portion from its first end 45 to a first corner forms, e.g., a positive radial rake angle ρ (FIG. 1C), and so that the rest of the active edge portion from that first corner to the second end 47 of the edge portion is disposed at a particular axial rake angle μ, which may be different than the radial rake. Similarly, as seen in FIGS. 3A-3C, the wedge angle θ is different at different points along the edge portion 43 with a sharper edge be provided at a deepest part of the cut into the workpiece from the first end 45 to the first corner 41, which can reduce cutting force required for a given depth of cut, and a stronger edge can be provided at portions of the edge portion in a feed direction of the rotating tool 21, which can facilitate providing a faster rate of feed. As seen in FIG. 2B, the rake surface 61 proximate the second end 47 of the edge portion 43 can be disposed below a plane of a planar supporting surface 63 and can form an obtuse wedge angle, while other portions of the rake surface can be disposed above the plane of the supporting surface 63 and form acute wedge angles.

Thus, the present invention aims at disclosing a rotating tool and an octagonal cutting insert suitable for face milling to obtain a planar generated surface while using larger cutting depths than at conventional octagonal cutting inserts and maintaining positive axial rake angles giving a high performance tool.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 11155730.2, from which this application claims priority, are incorporated herein by reference.

The invention claimed is:

1. A cutting insert, comprising:
   a top surface;
   a bottom surface;
   a side surface extending between the top surface and the bottom surface, wherein the top surface is generally octagonal in shape and the side surface includes eight sides and eight corners, each side being defined by two corners at opposite ends of the side; and
   four edge portions are formed at an intersection of the top surface and the side surface, a first end of each edge portion beginning along one of the eight sides at a non-zero distance from any of the eight corners and a second end of the edge portion ending along another one of the eight sides that is non-consecutive to the one of the sides at the non-zero distance from any of the eight corners, each edge portion having a wedge angle that changes from a first angle at the first end of the edge portion to a different angle at the second end of the edge portion.

2. The cutting insert as set forth in claim 1, wherein the wedge angle is an acute angle at the first end of the edge portion.

3. The cutting insert as set forth in claim 1, wherein the side surface at least partially defines a curved portion such as a part of a cylinder.

4. The cutting insert as set forth in claim 1, wherein the side surface is defined by one or more planar segments spaced by curved portions.

5. The cutting insert as set forth in claim 1, wherein the bottom surface is identical to the top surface.

6. The cutting insert as set forth in claim 1, wherein the first end of each of the four edge portions begins on a same one of the sides as the second end of another one of the four edge portions.

7. The cutting insert as set forth in claim 1, wherein the cutting insert includes a transition portion between the first end of each edge portion and a second end of a preceding one of the four edge portions.

8. The cutting insert as set forth in claim 7, wherein a first end of the transition portion is adjacent the second end of the edge portion and is disposed substantially at a midpoint of a side.

9. The cutting insert as set forth in claim 8, wherein a second end of the transition portion adjacent the first end of the edge portion is disposed substantially midway between the midpoint of the side and a corner at an end of the side.

10. The cutting insert as set forth in claim 1, wherein each edge portion extends, beginning at the first end of the edge portion, over part of a first side of the eight sides, over all of a second side succeeding the first side, and, ending at the second end of the edge portion, over part of a third side succeeding the second side.

11. The cutting insert as set forth in claim 10, wherein at least one wedge angle of the edge portion along the first side is an acute angle.

12. The cutting insert as set forth in claim 10, wherein at least one wedge angle of the edge portion along the third side is an obtuse angle.

13. The cutting insert as set forth claim 10, wherein at least one wedge angle of the edge portion along at least part of the second side is an acute angle.

14. The cutting insert as set forth in claim 10, wherein at least one wedge angle of the edge portion along at least part of the third side is an obtuse angle.

15. The cutting insert as set forth in claim 1, wherein a part of each edge portion starting at the first end of the edge portion and ending at a next corner is parallel with an insert supporting surface of the cutting insert, and another part of the edge portion forms an acute angle with the insert supporting surface.

16. A rotating tool, comprising;
   a toolholder having at least one insert receiving recess for receiving a cutting insert the cutting insert including a top surface, a bottom surface, a side surface extending between the top surface and the bottom surface, wherein the top surface is generally octagonal in shape and the side surface includes eight sides and eight corners, each side being defined by two corners at opposite ends of the side, and four edge portions formed at an intersection of the top surface and the side surface, a first end of each edge portion beginning along one of the eight sides at a non-zero distance from any of the eight corners and a second end of the edge portion ending along another one of the eight sides that is non-consecutive to the one of the sides at the non-zero distance from any of the eight corners, each edge portion having a wedge angle that changes from a first angle at the first end of the edge portion to a different angle at the second end of the edge portion; and
   a clamp for clamping the cutting insert in the recess such that at least an active edge portion of the edge portion is located in an active position.

17. The rotating tool as set forth in claim 16, wherein the supporting surfaces of the cutting insert abut abutment surfaces of the recess when the cutting insert is clamped in the recess by the clamp so that the insert is mounted at least at one of an axially negative angle and a radially negative angle relative to the toolholder.

18. The rotating tool as set forth in claim 16, wherein the cutting insert is mounted so that at least one of a positive radial rake angle and a positive axial rake angle is maintained all along the active edge portion.

* * * * *